(12) United States Patent
Yagyu

(10) Patent No.: US 11,651,950 B1
(45) Date of Patent: May 16, 2023

(54) EXCIMER LAMP AND ULTRAVIOLET LIGHT IRRADIATION DEVICE

(71) Applicant: Ushio Denki Kabushiki Kaisha, Tokyo (JP)

(72) Inventor: Hideaki Yagyu, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/050,264

(22) Filed: Oct. 27, 2022

(30) Foreign Application Priority Data

Oct. 29, 2021 (JP) .............................. JP2021-177312

(51) Int. Cl.
*H01J 61/30* (2006.01)
*H01J 61/36* (2006.01)
*H01J 61/16* (2006.01)

(52) U.S. Cl.
CPC ............ *H01J 61/302* (2013.01); *H01J 61/16* (2013.01); *H01J 61/361* (2013.01)

(58) Field of Classification Search
CPC ......... H01J 61/302; H01J 61/16; H01J 61/361
See application file for complete search history.

(56) References Cited

U.S. PATENT DOCUMENTS

| 6,451,719 B1* | 9/2002 | Yamagata | ........... C03B 19/1453 501/905 |
| 2019/0192708 A1* | 6/2019 | Igarashi | .................... A61L 2/10 |

FOREIGN PATENT DOCUMENTS

JP 2021-114423 A 8/2021

* cited by examiner

*Primary Examiner* — Anne M Hines
(74) *Attorney, Agent, or Firm* — Studebaker & Brackett PC

(57) ABSTRACT

An excimer lamp includes light-emitting gases containing krypton gas and chlorine gas in a sealing body composed of fused quartz glass having an absorption band at least in a wavelength band of 240 nm to 260 nm. An ultraviolet light irradiation device includes: an excimer lamp having light-emitting gases containing krypton gas and chlorine gas in a sealing body; a housing having an extraction part for extracting ultraviolet light emitted from an excimer lamp; and fused quartz glass disposed in the extraction part and having an absorption band at least in a wavelength band of 240 nm to 260 nm.

20 Claims, 5 Drawing Sheets

EXCIMER LAMP AND ULTRAVIOLET LIGHT IRRADIATION DEVICE

CROSS REFERENCE TO RELATED APPLICATIONS

This application claims priority of Japan Patent Application No. 2021-177312, which was filed on Oct. 29, 2021, and which is incorporated herein in its entirety by reference.

BACKGROUND OF THE INVENTION

Field of the Invention

The present invention relates to an excimer lamp and an ultraviolet light irradiation device.

Description of the Related Art

It is known that deoxyribonucleic acid (DNA) has an absorption maximum around a wavelength of 260 nm. A low-pressure mercury lamp shows a high emission spectrum around a wavelength of 254 nm. Therefore, conventionally, a sterilization technology performed by applying ultraviolet light from the low-pressure mercury lamp is widely used.

Meanwhile, light around a wavelength of 254 nm is a risk to a human body to cause adverse effect when being irradiated thereto. In recent years, it has become clear that the harmfulness to the human body is greatly reduced by ultraviolet light having a wavelength of 235 nm or less, and a technique for performing sterilization or virus inactivation using ultraviolet light having a wavelength of 235 nm or less has become known.

A krypton-chlorine (KrCl) excimer lamp is known as a light source that emits light in a wavelength band of 235 nm or less (see Patent Document 1). In the KrCl excimer lamp, krypton gas and chlorine gas are sealed in a sealing body as light-emitting gases. By applying energy to the light-emitting gases, krypton and chlorine form an excited dimer (KrCl*), and emit ultraviolet light having a main peak wavelength of 222 nm when shifting to the ground state.

PRIOR ART DOCUMENT

Patent Document

Patent Document 1: JP-A-2021-114423

SUMMARY OF THE INVENTION

FIG. 1 shows an emission spectrum of a KrCl excimer lamp. The KrCl excimer lamp has a very small light output even in a wavelength band of 240 nm or more which possibly cause an adverse effect on the human body. In order to use the KrCl excimer lamp more safely, the light in this wavelength band of 240 nm or more is desirably reduced.

An object of the present invention is to provide an excimer lamp or an ultraviolet light irradiation device that reduces light in a wavelength band which possibly cause an adverse effect on a human body.

As described above, the KrCl excimer lamp emits ultraviolet light having the main peak wavelength of 222 nm, which is a very short wavelength. Therefore, as a member through which radiation light from the KrCl excimer lamp passes (for example, as a sealing body of the lamp), synthetic quartz glass that can obtain high transmittance even with short-wavelength ultraviolet light has been used. The synthetic quartz glass has not only an advantage of having high light transmittance but also an advantage of having excellent electrical insulation property and chemical stability.

On the other hand, fused quartz glass generally has lower transmittance of short-wavelength ultraviolet light than the synthetic quartz glass, and is inferior in electrical insulation property and chemical stability. Therefore, the fused quartz glass has been considered unsuitable as an optical member used for the KrCl excimer lamp and the irradiation device thereof. However, as a result of intensive studies, the present inventor has found that a part of the fused quartz glass has a characteristic of having an absorption band for reducing light in a wavelength band of 240 nm to 260 nm, which is not present in the synthetic quartz glass. As a result, the present inventor has devised an excimer lamp utilizing the found characteristics. Although the details are described later, it is considered that oxygen defects contained in the fused quartz glass are involved in expression of this characteristic.

The excimer lamp according to one embodiment is a KrCl excimer lamp in which light-emitting gases containing krypton gas and chlorine gas are sealed in a sealing body made of fused quartz glass having an absorption band at least in a wavelength band of 240 nm to 260 nm. As will be described in detail later, "fused quartz glass having an absorption band" is fused quartz glass having two contact points at which a transmittance curve and a double tangent of the transmittance curve are in contact with each other in a transmission spectrum of the fused quartz glass, and in which, in a wavelength band between the two contact points, the transmittance curve has a transmittance that is lower than a transmittance on the double tangent. When at least a part of the "wavelength band between the two contact points" overlaps with the wavelength range of 240 nm or more and 260 nm or less, the fused quartz glass "has an absorption band at least in a wavelength band of 240 nm to 260 nm". The sealing body is made of fused quartz glass having the absorption band at least in a wavelength band of 240 nm to 260 nm. Accordingly, light in the wavelength band of 240 nm to 260 nm emitted from the KrCl excimer lamp is reduced by the sealing body. As a result, sterilization and virus inactivation can be performed using ultraviolet light having a wavelength of less than 235 nm while adverse effects on the human body is minimized.

The sterilization or virus inactivation by an excimer lamp corresponds to Goal 3 "Ensure healthy lives and promote well-being for all at all ages" of the UN-led Sustainable Development Goals (SDGs), and greatly contributes to Goal 3.3 "By 2030, end the epidemics of AIDS, tuberculosis, malaria and neglected tropical diseases and combat hepatitis, water-borne diseases and other communicable diseases".

A local minimum value of the transmittance through the fused quartz glass may be in a range of 235 nm or more and 250 nm or less. Accordingly, light emitted from the KrCl excimer lamp in a wavelength band desired to be particularly limited is further reduced.

Assuming that a light intensity is 1 when light having a wavelength of 350 nm passes through the fused quartz glass, a light intensity at the local minimum value of transmittance through the fused quartz glass may be 0.95 or less.

The fused quartz glass may have a hydroxyl (OH) group concentration of 50 wt·ppm or less. There is a case where heat is applied to the fused quartz glass in a process of forming a sealing body or the like, but when the fused quartz glass contains a large amount of OH groups, there is a possibility that the OH group repairs the oxygen defects and the oxygen defects are reduced as the fused quartz glass is heated. Because the oxygen defects selectively absorb light in the wavelength band of 240 nm to 260 nm, the reduction in the oxygen defects hinders the absorption of light in the wavelength band of 240 nm to 260 nm. Therefore, by limiting the amount of OH group to 50 wt·ppm or less, the oxygen defects are less likely to be repaired even when the fused quartz glass is heated.

It is sufficient that at least one of the followings is satisfied: a titanium (Ti) concentration in the fused quartz glass is 5 wt·ppm or less; an iron (Fe) concentration in the fused quartz glass is 3 wt·ppm or less; and a manganese (Mn) concentration in the fused quartz glass is 3 wt·ppm or less. Ti, Fe, and Mn deteriorate the transmittance of the ultraviolet light through the fused quartz glass, the ultraviolet light having the main peak wavelength of 222 nm and emitted from the KrCl excimer lamp. By limiting at least one of the concentrations of Ti, Fe, and Mn to the above predetermined value or less, the transmittance of the ultraviolet light having a main peak wavelength of 222 nm through the fused quartz glass is easily maintained at the high level.

The fused quartz glass may be disposed not only in the sealing body of the excimer lamp but also in an extraction part of a housing accommodating the excimer lamp in the ultraviolet light irradiation device, the extraction part being configured to extract ultraviolet light emitted from the excimer lamp.

For example, an ultraviolet light irradiation device according to an embodiment includes: an excimer lamp having the above-described features; a housing that accommodates the excimer lamp and includes an extraction part that is configured to extract ultraviolet light to be emitted from the excimer lamp; and fused quartz glass disposed in the extraction part and having an absorption band at least in a wavelength band of 240 nm to 260 nm.

An ultraviolet light irradiation device according to an embodiment includes: an excimer lamp that contains krypton gas and chlorine gas as light-emitting gases in a sealing body that does not need to be constituted of fused quartz glass having an absorption band at least in a wavelength band of 240 nm to 260 nm; a housing that accommodates the excimer lamp and includes an extraction part that is configured to extract ultraviolet light to be emitted from the excimer lamp; and fused quartz glass disposed in the extraction part and having an absorption band at least in a wavelength band of 240 nm to 260 nm.

In addition, the same additional configuration as that of the fused quartz glass constituting the sealing body may be applied to the fused quartz glass disposed in the extraction part.

Accordingly, an excimer lamp or an ultraviolet light irradiation device that reduces light in a wavelength band which possibly cause an adverse effect on a human body can be provided.

DETAILED DESCRIPTION OF THE PREFERRED EMBODIMENTS

Figure 1:
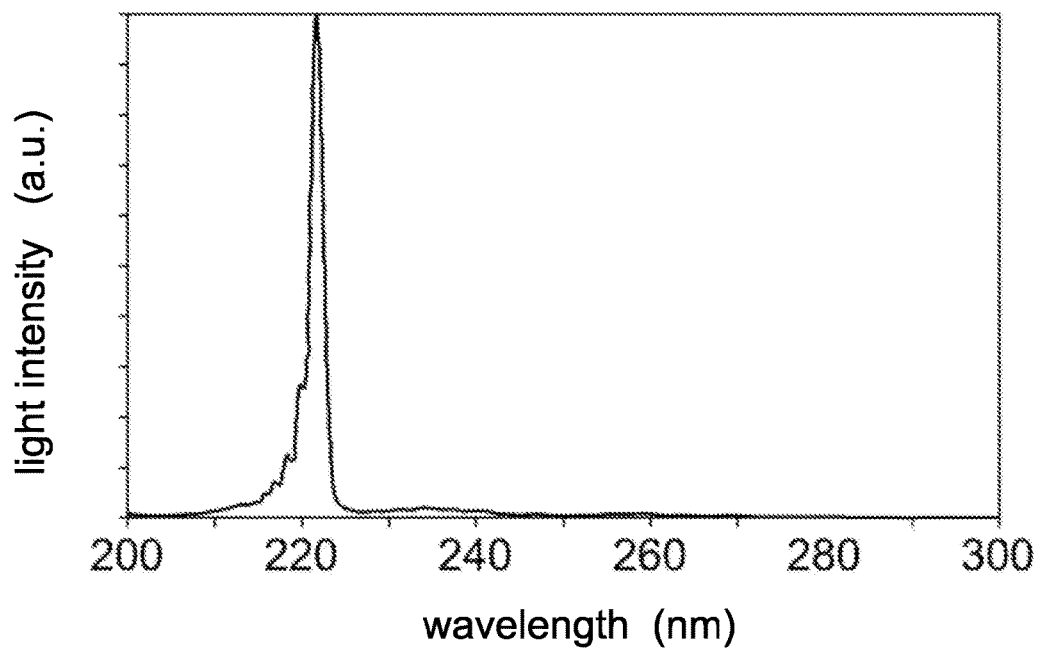
FIG. 1 is a view showing an emission spectrum of a KrCl excimer lamp.

An ultraviolet light irradiation device according to an embodiment is described with reference to the drawings. Note that the following drawings are schematically illustrated, the dimensional ratio in the drawings do not necessarily coincide with the actual dimension ratio, and the dimensional ratios do not necessarily coincide between the drawings.

Hereinafter, each of the drawings is described with reference to an XYZ coordinate system as appropriate. In the XYZ coordinate system, a traveling direction of emitted ultraviolet light on an optical axis is defined as the +X direction, and a plane orthogonal to the X direction is defined as a YZ plane. In describing directions in the present specification, in the case of distinguishing whether the direction is positive or negative, the positive or negative symbol is added, such as the "+X direction" or the "−X direction". In the case where there is no need to distinguish between positive and negative directions, the direction is simply described as the "X direction". Namely, in the present specification, in the case where the direction is simply described as the "X direction", both "+X direction" and "−X direction" are included. The same applies to the Y direction and the Z direction.

First Embodiment

[Outline of Ultraviolet Light Irradiation Device]

Figure 2:
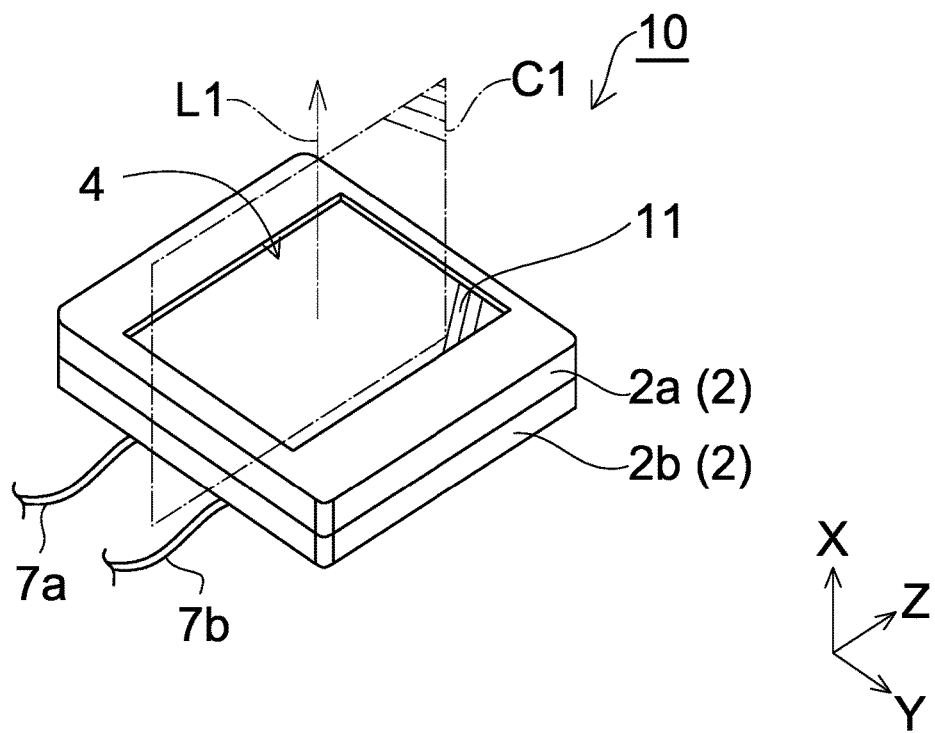
FIG. 2 is a perspective view of the ultraviolet light irradiation device according to a first embodiment.
Figure 3:
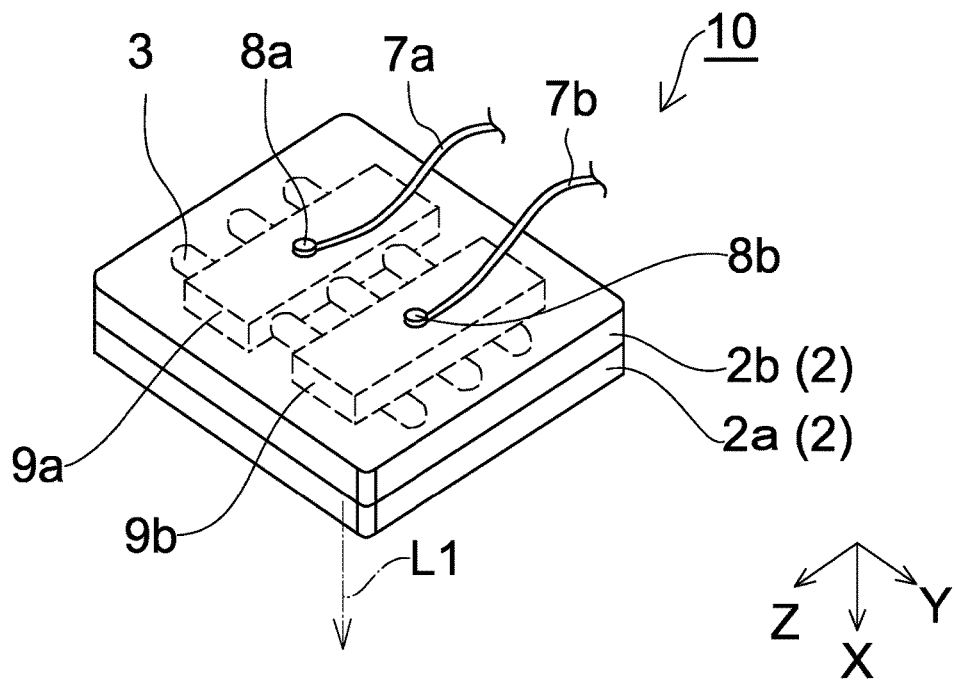
FIG. 3 is a perspective view of the ultraviolet light irradiation device according to the first embodiment.
Figure 4:
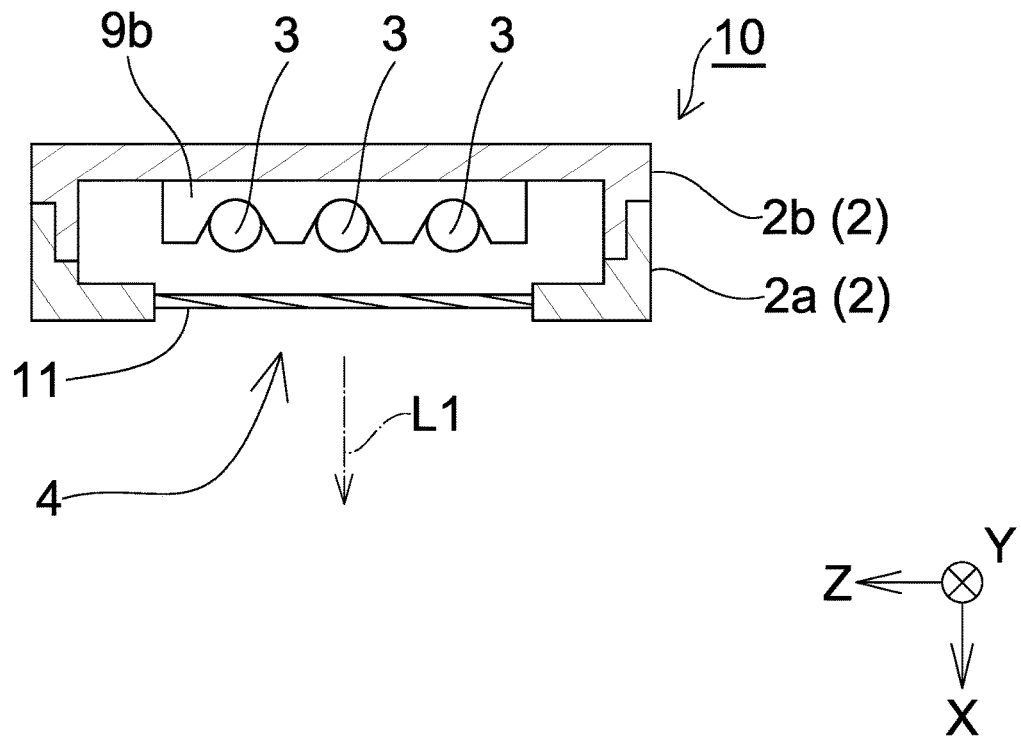
FIG. 4 is a cross-sectional view as viewed from a direction of a plane C1 in FIG. 2.

An outline of an embodiment of an ultraviolet light irradiation device is described with reference to FIGS. 2, 3, and 4. FIGS. 2 and 3 are perspective views of the ultraviolet light irradiation device. FIG. 4 is a cross-sectional view as viewed from a direction of a plane C1 in FIG. 2.

The ultraviolet light irradiation device 10 of the present embodiment includes an excimer lamp 3 that emits ultraviolet light, a housing 2 that accommodates the excimer lamp 3, and an extraction part 4 that extracts the ultraviolet light emitted from the excimer lamp 3 to the outside of the housing 2 in the +X direction. As shown in FIG. 4, an ultraviolet light transmitting material 11 that transmits ultraviolet light is disposed so as to be fitted into the extraction part 4. The ultraviolet light transmitting material 11 partitions the outside and the inside of the housing 2. The ultraviolet light transmitting material 11 may be made of synthetic quartz glass.

In FIGS. 2, 3, and 4, an optical axis of the light emitted from the extraction part 4 is denoted by "L1". An arrow indicating the traveling direction of the light beam emitted on the optical axis is added to the optical axis L1. The tube axis direction of the three excimer lamps 3 respectively is along the Y direction, and the direction in which the excimer lamps 3 are aligned is along the Z direction.

In the present embodiment, the housing 2 includes a first frame 2a having an opening functioning as the extraction part 4 at the center and a second frame 2b having no opening. The second frame 2b and the first frame 2a are fitted to each other to form an internal space surrounded by the housing 2. In this internal space, the excimer lamps 3 and two electrode blocks (9a and 9b) that supplies power to the excimer lamps 3 are disposed (see FIG. 4). The frame constituting the housing 2 may include three or more frames.

The two electrode blocks (9a and 9b) are fixed to the inner surface of the second frame 2b (see FIG. 3 or FIG. 4). Two connection terminals (8a and 8b) are provided on the outer surface of the second frame 2b (see FIG. 3). The two connection terminals (8a and 8b) are respectively electrically connected to the electrode blocks (9a and 9b) with the second frame 2b interposed therebetween. The two connection terminals (8a and 8b) are respectively connected to power supply lines (7a and 7b) fed with power from an external power supply (not illustrated).

Figure 5:
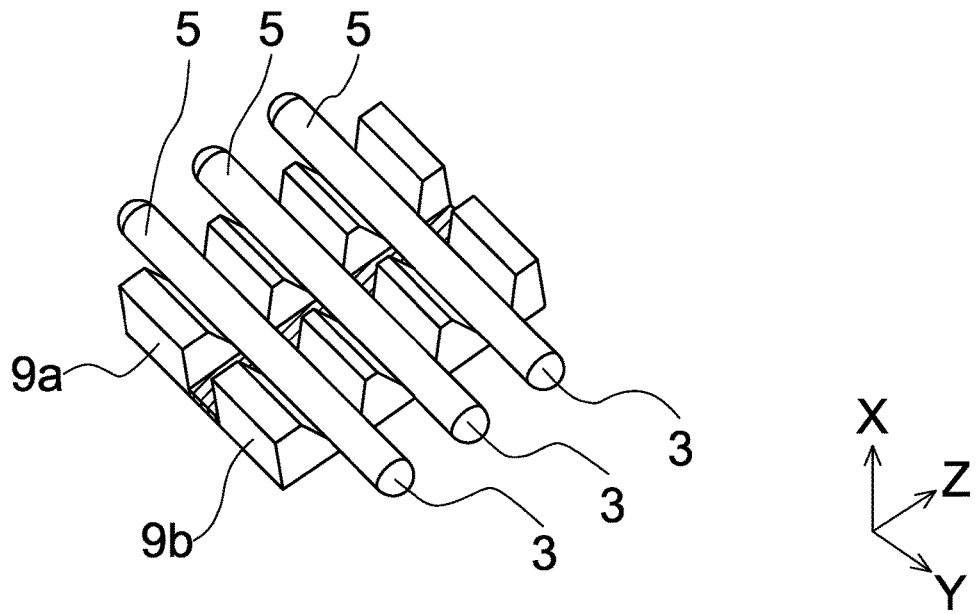
FIG. 5 is a perspective view showing only light sources and electrode blocks taken out from the ultraviolet light irradiation device.

FIG. 5 is a perspective view showing only the excimer lamps 3 and the electrode blocks (9a and 9b) taken out from the ultraviolet light irradiation device. The excimer lamp 3 includes a hollow sealing body 5, and light-emitting gases are sealed therein. The sealing body 5 is in contact with each of the two electrode blocks (9a and 9b), whereby power is supplied to each excimer lamp 3.

The light-emitting gases are a mixed gas of krypton gas and chlorine gas. When a high voltage is applied to the electrode blocks (9a and 9b), dielectric-barrier discharge occurs in the sealing body 5, and an excited dimer (KrCl*) of krypton and chlorine is generated inside the sealing body 5. When the excited dimer returns to the ground state, ultraviolet light having a main peak wavelength of 222 nm is emitted. The emitted ultraviolet light passes through the sealing body 5 and is emitted to the outside of the excimer lamp 3. Note that the excimer lamp 3 shown in FIGS. 2 to 5 merely exemplifies one embodiment, and matters other than that krypton gas and chlorine gas are sealed in the sealing body 5, such as the shape of the sealing body 5 and the arrangement or shape of the electrodes, are not particularly limited.

[Sealing Body]

Figure 6A:
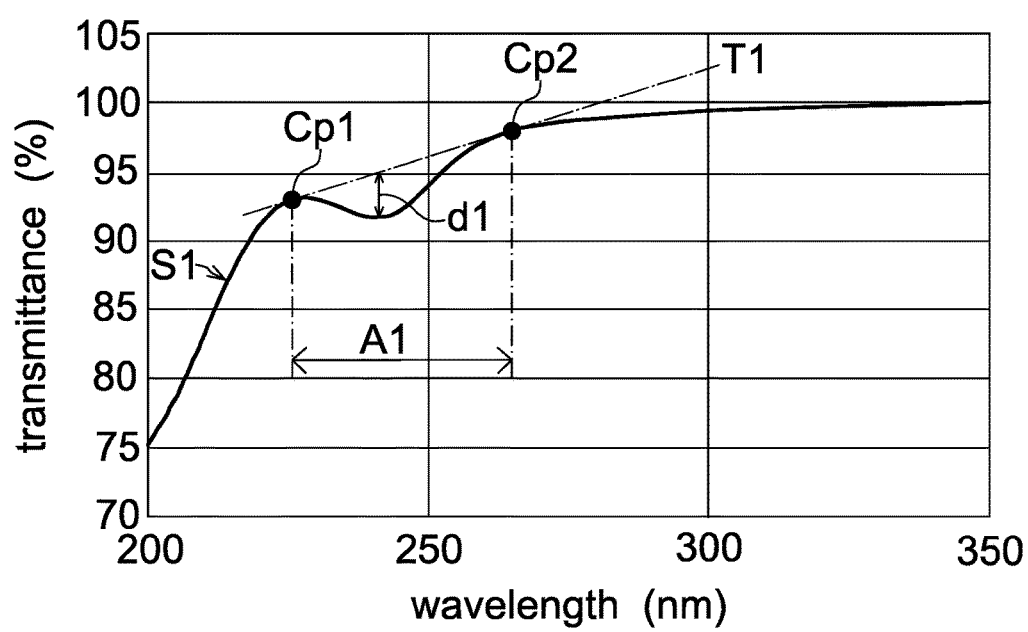
FIG. 6A is a view showing a transmission spectrum of quartz glass.
Figure 6B:
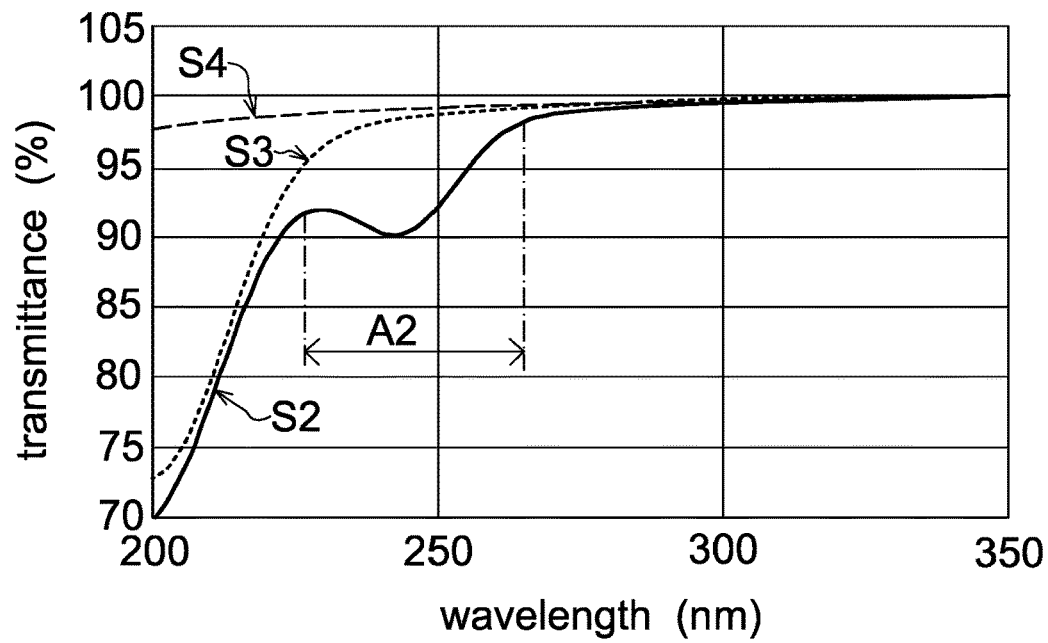
FIG. 6B is a view showing a transmission spectrum of quartz glass.

In the present embodiment, fused quartz glass is used for the sealing body 5 that transmits ultraviolet light. The reason is described with reference to FIGS. 6A and 6B. FIGS. 6A and 6B are views each showing a transmission spectrum of quartz glass. In FIG. 6A, a transmittance curve S1 shows an example of a transmission spectrum of fused quartz glass. In FIG. 6B, a transmittance curve S2 shows an example of a transmission spectrum of fused quartz glass having an absorption band, a transmittance curve S3 shows an example of a transmission spectrum of fused quartz glass having no absorption band, and a transmittance curve S4 shows an example of a transmission spectrum of synthetic quartz glass. The vertical axes in FIGS. 6A and 6B represent relative transmittances at respective wavelengths assuming that the transmittance through quartz glass transmitting light of 350 nm is 100%.

With reference to the transmittance curve S1 in FIG. 6A, a change in transmittance through the fused quartz glass having the transmittance curve S1 is described in descending order of wavelength. As the wavelength decreases from 350 nm to 262 nm, the transmittance gradually decreases. From 262 nm, the transmittance begins to decrease sharply, and the decrease in transmittance continues until 242 nm. The transmittance reaches a local minimum value at 242 nm. As the wavelength decreases from 242 nm to 226 nm, the transmittance gradually increases. The transmittance reaches a local maximum value at 226 nm. When the wavelength falls below 226 nm, the transmittance starts to decrease, and when the wavelength falls below 215 nm, the transmittance becomes less than 80%.

When a tangent is drawn on the transmittance curve S1, a double tangent T1 that is in contact with the transmittance curve S1 at two points (Cp1 and Cp2) can be drawn. A wavelength band A1 between the contact points (Cp1 and Cp2) of the double tangent T1 with the transmittance curve S1 is an absorption band of the fused quartz glass having the transmittance curve S1. The absorption band A1 of the fused quartz glass shown in FIG. 6A is 226 nm to 262 nm.

Because the absorption band A1 overlaps with the wavelength range of 240 nm or more and 260 nm or less, the fused quartz glass having this absorption band A1 is "fused quartz glass having an absorption band at least in a wavelength band of 240 nm to 260 nm". By transmitting radiation light from the KrCl excimer lamp through the fused quartz glass, it is possible to obtain an effect of reducing light in the wavelength band of 240 nm to 260 nm that has a risk of adversely affecting the human body. The main peak wavelength of 222 nm is close to the local maximum value of the transmittance curve S1 and is not in the wavelength range of 240 nm to 260 nm, and thus transmits more light than the wavelength to be limited.

It is known that ultraviolet light having a wavelength of 200 nm or less generates ozone from oxygen in the atmosphere. When the concentration of ozone is high, the ozone may adversely affect the human body. Because the transmittance curve S1 has a low transmittance of ultraviolet light having the wavelength of 200 nm or less, transmitting radiation light from the KrCl excimer lamp through the fused quartz glass leads to a decrease in the probability of generating the ozone. This is an effect that cannot be obtained by synthetic quartz glass described later.

Referring to the transmittance curve S2 in FIG. 6B, similarly to the transmittance curve S1, the transmittance curve S2 can have a double tangent of the transmittance curve S2 drawn and has two contact points with the double tangent. An absorption band A2, which is a wavelength band between the two contact points, overlaps with the wavelength range of 240 nm to 260 nm. Therefore, the fused quartz glass having this absorption band A2 is "fused quartz glass having an absorption band at least in a wavelength band of 240 nm to 260 nm".

With reference to the transmittance curve S3 in FIG. 6B, a change in transmittance through the fused quartz glass having the transmittance curve S3 is described in descending order of wavelength. As the wavelength decreases from 350 nm to 233 nm, the transmittance gradually decreases. The transmittance starts to decrease rapidly from 233 nm. The rapid decrease in transmittance continues down to around 200 nm. The transmittance curve S3 does not have a local maximum value and a local minimum value. When a tangent line is drawn on the transmittance curve S3, a tangent line having only one contact point can be drawn, but a double tangent line in contact with the transmittance curve S3 at two points cannot be drawn. The fused quartz glass having the transmittance curve S3 has no absorption band.

With reference to the transmittance curve S4 in FIG. 6B, a change in transmittance through the synthetic quartz glass having the transmittance curve S4 is described in descending order of wavelength. As the wavelength decreases from 350 nm to 200 nm, the transmittance gradually decreases. The transmittance curve S4 does not have a local maximum value and a local minimum value. When a tangent line is drawn on the transmittance curve S4, a tangent line having only one contact point can be drawn, but a double tangent line in contact with the transmittance curve S4 at two points cannot be drawn. Therefore, the synthetic quartz glass having the transmittance curve S4 has no absorption band. The synthetic quartz glass having the transmittance curve S4 has a transmittance of 95% or more in all the wavelength bands of 200 nm to 350 nm.

The maximum value of a reduction width of the transmittance appears in the local minimum value of the transmittance curve. As described above, the local minimum value of the transmittance curve S1 appears when the wavelength is 242 nm. When the local minimum value is in a range of 240 nm or more and 250 nm or less, the effect of reducing light in a wavelength band desired to be particularly limited in the absorption band A1 is enlarged. In addition, a material having the local minimum value in the transmittance curve S1 in the wavelength band of 235 nm or more and 250 nm or less including a wavelength band desired to be particularly limited may be used. The local minimum value in the transmittance curve S1 in FIG. 6A is 92 (%). Assuming that the light intensity is 1 (transmittance is 100%) when light having a wavelength of 350 nm passes through the fused quartz glass, it is sufficient that a light intensity at the local minimum value of the transmittance curve of the fused quartz glass is 0.95 or less (transmittance of 95% or less).

In FIG. 6A, the transmittance in the absorption band A1 of the transmittance curve S1 shows a reduction width dl of 3% at the maximum as compared with the transmittance on the double tangent line. The reduction width dl is preferably as large as possible, but the reduction width dl of the transmittance in the absorption band A1 may be small. For example, regarding the transmittance in the absorption band A1, the reduction width dl with respect to the transmittance on the double tangent may be 1% or more. The difference in transmittance between the local maximum value and the local minimum value may be 1% or more, preferably 2% or more, and more preferably 3% or more.

[Oxygen Defects]

The presence of the absorption bands (A1 and A2) overlapping with the wavelength band of 240 nm to 260 nm described above results from the fact that the fused quartz glass contains a large amount of oxygen defects. Quartz glass is normally a structure in which regular silicon-oxygen tetrahedrons ($SiO_4$) each regarded as a unit are irregularly bonded. However, in a portion called an oxygen defect, $SiO_4$ is not formed and has a defect structure of oxygen (O) not being bonded to silicon (Si). Then, the defect structure absorbs light having a unique wavelength. The transmittance curves of fused quartz glass and synthetic quartz glass having a small amount of oxygen defects have no absorption band. Examples of the fused quartz glass having the oxygen defects include GE214 manufactured by Momentive Technologies and PQ871 manufactured by Jiangsu Pacific Quartz Co., Ltd. In addition, the fused quartz glass produced by the electric melting method tends to have desired oxygen defects, and is easily applied as the fused quartz glass of the present invention.

There are a plurality of types of oxygen defects due to a difference in a defect structure, such as a silicon lone-pair center (SLPC) defect, a non-bridging oxygen hole center (NBOHC) defect, or an oxygen deficient center (ODC) defect. The various defect structures each have different peaks of the absorption band, and as a result, absorb light of a specific wavelength. For example, the SLPC defect have a peak of the energy absorption band of 5.15 eV and absorb light with a wavelength of 241 nm. The NBOHC defect have a peak of the energy absorption band of 4.8 eV and absorb light with a wavelength of 258 nm. The ODC defect have a peak of the energy absorption band of 5.02 eV and absorb light with a wavelength of 247 nm. These various oxygen defects selectively absorb light in the wavelength band of 240 nm to 260 nm. As the amount of oxygen defects increases, the amount of absorption of light having a specific wavelength increases. The amount of oxygen defect that is present in the quartz glass can be estimated by analyzing a transmittance spectrum or an absorption spectrum of the fused quartz glass. The absorption band A1 of the transmittance curve S1 in FIG. 6A is 226 nm to 262 nm, but the wavelength width of the absorption band can be enlarged, reduced, or shifted, or the amount of absorption (transmittance) can be increased or decreased by adjusting the amount of defects or the thickness of glass.

A part of the fused quartz glass contains OH groups. When the fused quartz glass is heated and activated, the OH groups in the fused quartz glass serve as a source of oxygen atoms for repairing oxygen defects. In the present embodiment, when the oxygen defects are reduced by repairing the oxygen defects as described above, it becomes difficult to selectively absorb light in the wavelength band of 240 nm to 260 nm. Therefore, the OH group concentration in the fused quartz glass is preferably a specified value or less.

The OH group concentration in the fused quartz glass may be 50 wt·ppm or less, more preferably 30 wt·ppm or less, and still more preferably 20 wt·ppm or less. Fused quartz glass having a low OH group concentration contains a relatively large amount of electrically fused quartz produced by the electric melting method. The fused quartz glass is heated in a step of processing the fused quartz glass, for example, a step of processing the fused quartz glass into the shape of the sealing body 5 of the excimer lamp 3. In addition, the oxygen defects may be repaired by intentionally subjecting the fused quartz glass to heat treatment to bring the amount of oxygen defects close to a desired value.

The concentration of OH groups contained in the quartz glass can be calculated from an infrared absorption spectrum. A calculation procedure of the OH group concentration is described. The quartz glass having a thickness t [mm] to be measured is irradiated with an infrared ray, and the infrared ray transmitted through the quartz glass is measured by an infrared spectrophotometer. As a result, the infrared absorption spectrum is obtained. Then, for an infrared absorption band around a wavelength of 2.73 μm in the infrared absorption spectrum due to OH groups in the quartz glass, the transmittance (Tb [%]) at the wavelength of an infrared absorption peak in the absorption band and the transmittance (Ta [%]) (here, the transmittance [%] at a wavelength of 2.60 μm) at the wavelength that is not affected by the infrared absorption are read. The OH group concentration (C [wt·ppm]) in the quartz glass is calculated based on the following equation (1).

$$\text{OH group concentration } (C) = (1/t) \times (\text{Log}_{10}(Ta/Tb)) \times 997 \tag{1}$$

Impurities contained in the fused quartz glass reduces the transmittance of the ultraviolet light emitted from the KrCl excimer lamp and having the main peak wavelength of 222 nm. Among the impurities, particularly, titanium (Ti), iron (Fe), and manganese (Mn) are likely to be contained in the fused quartz glass as impurities and likely to cause deterioration in the transmittance. Therefore, the concentration of at least one of Ti, Fe, and Mn contained in the fused quartz glass is preferably equal to or less than a specified value.

For example, the concentration of Ti is preferably 5 wt·ppm or less, and more preferably 3 wt·ppm or less. This makes the transmittance of ultraviolet light having the main peak wavelength of 222 nm be maintained at a high level.

For example, the concentration of Fe contained in the fused quartz glass is preferably 3 wt·ppm or less, and more preferably 1.5 wt·ppm or less. This makes the transmittance of ultraviolet light having the main peak wavelength of 222 nm be maintained at a high level.

For example, the concentration of Mn contained in the fused quartz glass is preferably 3 wt·ppm or less, and more preferably 1 wt·ppm or less. This makes the transmittance of ultraviolet light having the main peak wavelength of 222 nm be maintained at a high level.

The concentration of impurities such as Ti, Fe, or Mn in the fused quartz glass can be measured using the inductively coupled plasma mass spectrometry (ICP-MS).

An absorption coefficient of the fused quartz glass for ultraviolet light having the wavelength of 240 nm is, for example, preferably 0.05/mm to 5/mm, preferably 1/mm to 5/mm, and more preferably 2/mm to 5/mm.

The thickness of the sealing body may be 5 mm or less, and is preferably 2 mm or less. This can suppress a decrease in transmittance of the ultraviolet light having a main peak wavelength of 222 nm, and enables a large irradiance to be obtained even when the fused quartz glass is used. The thickness of the sealing body may be 0.5 mm or more, and is preferably 1 mm or more. As the thickness of the sealing body increases, the effect of reducing light in the wavelength band of 240 nm to 260 nm increases.

Figure 7:
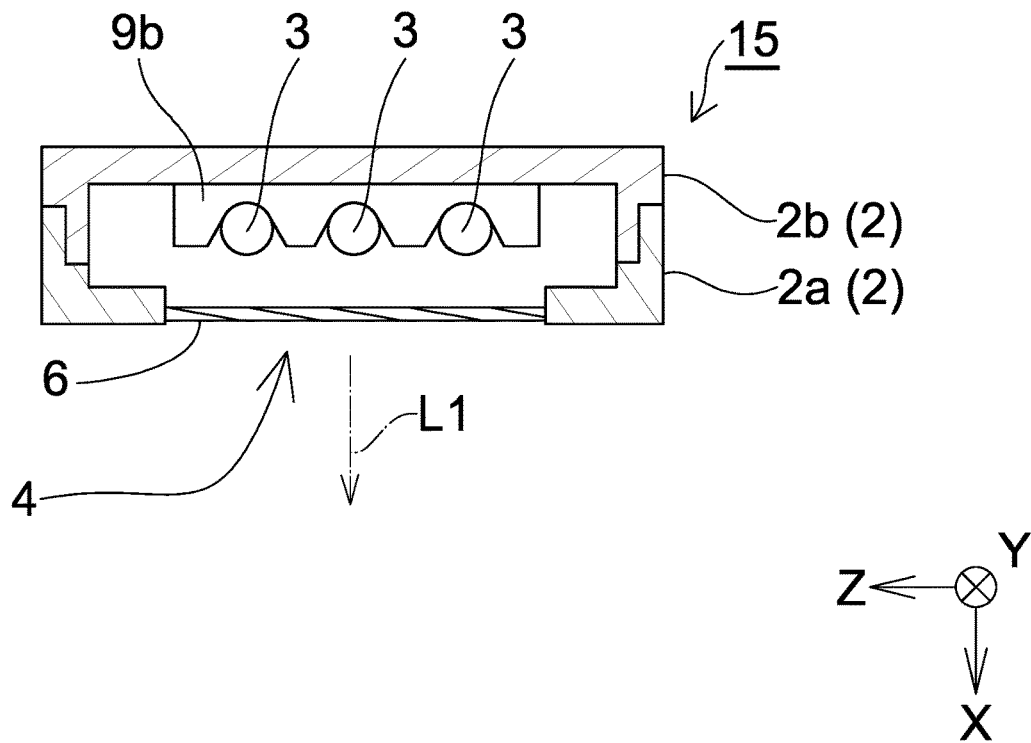
FIG. 7 is a cross-sectional view showing a modification of the first embodiment.

A modification of the ultraviolet light irradiation device is described with reference to FIG. 7. An ultraviolet light irradiation device 15 includes an optical filter 6 that transmits ultraviolet light belonging to a wavelength band of 190 nm to 235 nm and inhibits transmission of ultraviolet light in a wavelength band of 240 nm to 280 nm. For example, an optical filter can be adopted, in which, with respect to the light intensity of light having the peak wavelength in a wavelength band of 190 nm to 235 nm among the ultraviolet light emitted from the light source, when the emitted light from the light source enters the optical filter at an incident angle of 0 degrees, the light intensity of the ultraviolet light in a wavelength band of 240 nm to 280 nm is attenuated to 3% or less, or further to 1% or less after passing through the optical filter. In addition to using the fused quartz glass for the sealing body 5 of the excimer lamp 3, by disposing the optical filter 6 in the extraction part 4, the ultraviolet light of the wavelength band of 240 nm to 280 nm can be further reduced, and the safety of the ultraviolet light irradiation device 15 for a human body can be further enhanced. Furthermore, as the optical filter 6, it is preferable to adopt an optical filter that inhibits transmission of light in a wavelength band of 280 nm to 320 nm in addition to the above-described wavelength band, because the safety is further enhanced.

An arrangement place and a form of the optical filter 6 are not limited. As shown in FIG. 7, in addition to the optical filter 6 being disposed separated from the excimer lamp 3, the optical filter 6 may be disposed so as to be in contact with the excimer lamp 3 (as a specific example, the optical filter 6 is laminated on the surface of the sealing body 5).

The optical filter 6 is formed by, for example, forming a dielectric multilayer film in which dielectric films having different refractive indexes are alternately laminated on a base material made of quartz glass. Examples of the dielectric multilayer film include a dielectric multilayer film in which hafnium oxide ($HfO_2$) layers and silicon dioxide ($SiO_2$) layers are alternately laminated, and a dielectric multilayer film in which $SiO_2$ layers and aluminum oxide ($Al_2O_3$) layers are alternately laminated. The dielectric multilayer film in which the $HfO_2$ layer and the $SiO_2$ layer are alternately laminated can reduce the number of layers for obtaining the same wavelength-selective characteristic as compared with the dielectric multilayer film in which the $SiO_2$ layer and the $Al_2O_3$ layer are alternately laminated, and thus can increase the transmittance of selected ultraviolet light.

Second Embodiment

Figure 8:
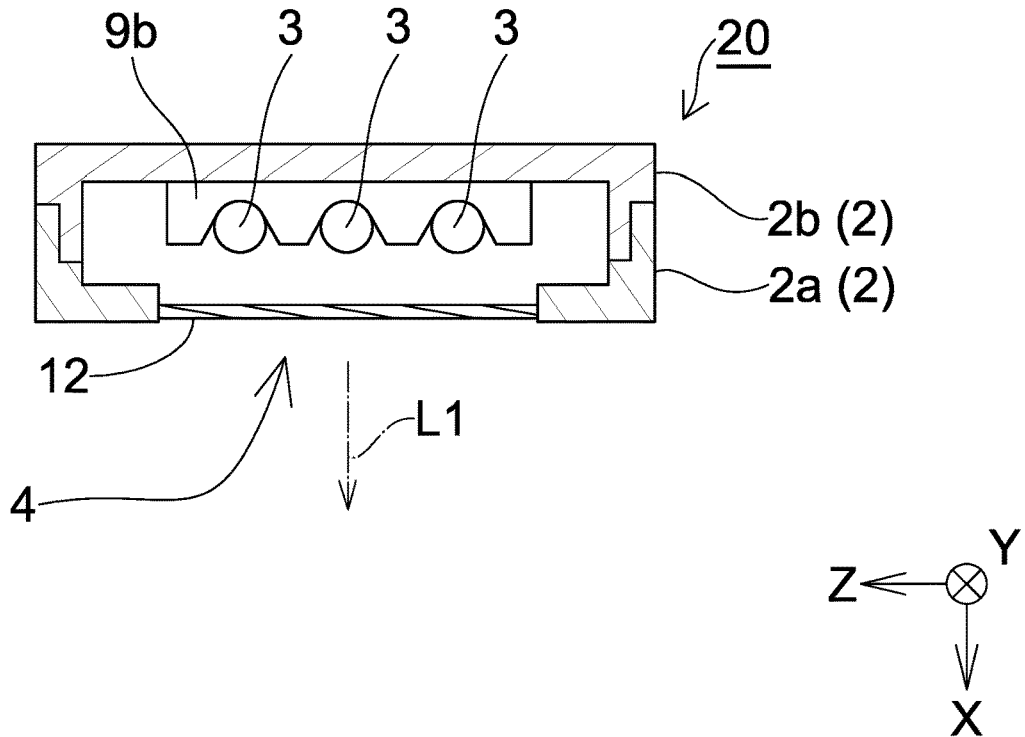
FIG. 8 is a cross-sectional view of an ultraviolet light irradiation device according to a second embodiment.

An ultraviolet light irradiation device according to a second embodiment is described with reference to FIG. 8. Matters other than those described below are the same as those in the first embodiment. In an ultraviolet light irradiation device 20, fused quartz glass 12 having an absorption band at least in a wavelength band of 240 nm to 260 nm is disposed in an extraction part 4. Accordingly, light in the wavelength band of 240 nm to 260 nm emitted from an excimer lamp 3 and is radiated from the ultraviolet light irradiation device 20 is reduced.

Because the fused quartz glass 12 having an absorption band at least in a wavelength band of 240 nm to 260 nm is disposed in the extraction part 4 of the ultraviolet light irradiation device 20, in the ultraviolet light irradiation device 20, a sealing body 5 of the excimer lamp 3 does not need to be made of fused quartz glass having the absorption band at least in a wavelength band of 240 nm to 260 nm. That is, the sealing body 5 may be made of fused quartz glass or synthetic quartz glass having no absorption band. In the case where the sealing body 5 of the excimer lamp 3 is made of fused quartz glass having an absorption band at least in a wavelength band of 240 nm to 260 nm, light in the wavelength band of 240 nm to 260 nm can be further reduced.

Figure 9:
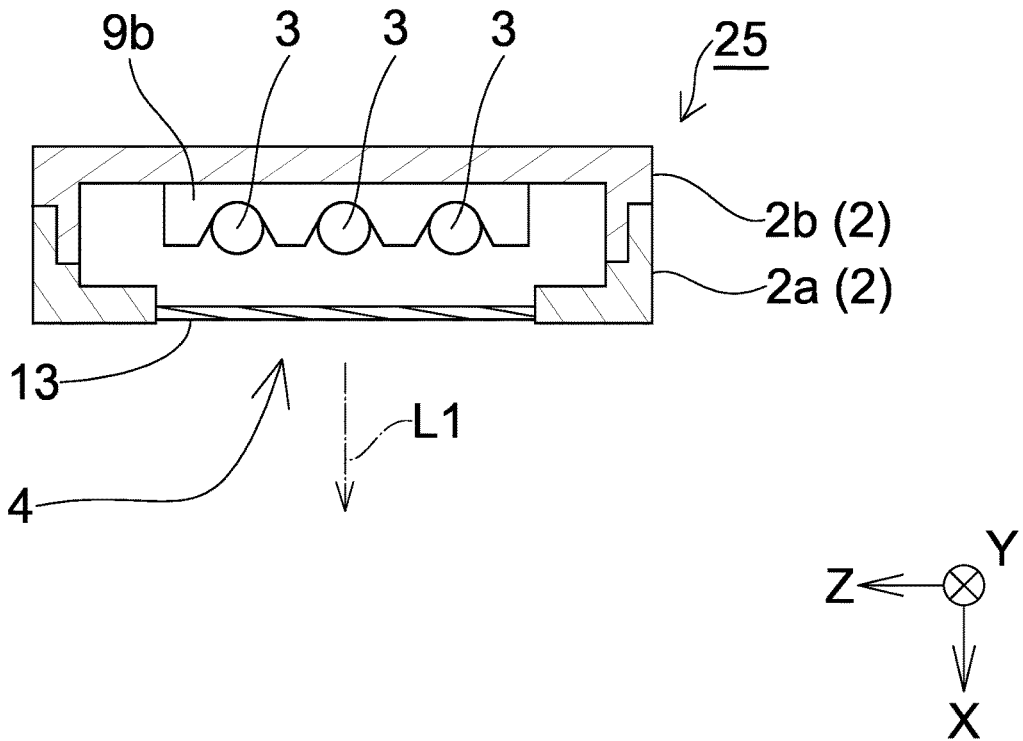
FIG. 9 is a cross-sectional view showing a modification of the second embodiment.

FIG. 9 is a cross-sectional view showing a further modification of the second embodiment. An ultraviolet light irradiation device 25 includes, in the extraction part 4, an optical filter 13 in which a dielectric multilayer film is laminated on fused quartz glass as a base material having the absorption band at least in a wavelength band of 240 nm to 260 nm. The optical filter 13 can obtain both an effect of reducing light in the wavelength band of 240 nm to 260 nm by the fused quartz glass having the absorption band at least in a wavelength band of 240 nm to 260 nm and an effect of reducing light in the wavelength band of 240 nm to 260 nm by the dielectric multilayer film.

What is claimed is:

1. An excimer lamp comprising:
   a sealing body including fused quartz glass having an absorption band at least in a wavelength band of 240 nm to 260 nm; and
   light-emitting gases sealed in an inside of the sealing body, the light-emitting gases containing krypton gas and chlorine gas.

2. The excimer lamp according to claim 1, wherein a wavelength at a local minimum of transmittance of the fused quartz glass is 235 nm or more and 250 nm or less.

3. The excimer lamp according to claim 2, wherein, assuming that a light intensity is 1 when light having a wavelength of 350 nm passes through the fused quartz glass, the light intensity is 0.95 or less at a local minimum value of transmittance through the fused quartz glass.

4. An ultraviolet light irradiation device comprising:
an excimer lamp according to claim 3;
a housing that accommodates the excimer lamp and includes an extraction part that is configured to extract ultraviolet light to be emitted from the excimer lamp; and
fused quartz glass disposed in the extraction part and having an absorption band at least in a wavelength band of 240 nm to 260 nm.

5. The excimer lamp according to claim 2, wherein the fused quartz glass has a hydroxyl (OH) group concentration of 50 wt·ppm or less.

6. The excimer lamp according to claim 2, wherein the fused quartz glass satisfies at least one of:
a titanium (Ti) concentration in the fused quartz glass is 5 wt·ppm or less;
an iron (Fe) concentration in the fused quartz glass is 3 wt·ppm or less; and
a manganese (Mn) concentration in the fused quartz glass is 3 wt·ppm or less.

7. An ultraviolet light irradiation device comprising:
an excimer lamp according to claim 2;
a housing that accommodates the excimer lamp and includes an extraction part that is configured to extract ultraviolet light to be emitted from the excimer lamp; and
fused quartz glass disposed in the extraction part and having an absorption band at least in a wavelength band of 240 nm to 260 nm.

8. The excimer lamp according to claim 1, wherein, assuming that a light intensity is 1 when light having a wavelength of 350 nm passes through the fused quartz glass, the light intensity is 0.95 or less at a local minimum value of transmittance through the fused quartz glass.

9. An ultraviolet light irradiation device comprising:
an excimer lamp according to claim 8;
a housing that accommodates the excimer lamp and includes an extraction part that is configured to extract ultraviolet light to be emitted from the excimer lamp; and
fused quartz glass disposed in the extraction part and having an absorption band at least in a wavelength band of 240 nm to 260 nm.

10. The excimer lamp according to claim 1, wherein the fused quartz glass has a hydroxyl (OH) group concentration of 50 wt·ppm or less.

11. The excimer lamp according to claim 1, wherein the fused quartz glass satisfies at least one of:
a titanium (Ti) concentration in the fused quartz glass is 5 wt·ppm or less;
an iron (Fe) concentration in the fused quartz glass is 3 wt·ppm or less; and
a manganese (Mn) concentration in the fused quartz glass is 3 wt·ppm or less.

12. An ultraviolet light irradiation device comprising:
an excimer lamp according to claim 1;
a housing that accommodates the excimer lamp and includes an extraction part that is configured to extract ultraviolet light to be emitted from the excimer lamp; and
fused quartz glass disposed in the extraction part and having an absorption band at least in a wavelength band of 240 nm to 260 nm.

13. An ultraviolet light irradiation device comprising:
an excimer lamp containing krypton gas and chlorine gas as light-emitting gases in a sealing body;
a housing that accommodates the excimer lamp and includes an extraction part that is configured to extract ultraviolet light to be emitted from the excimer lamp; and
fused quartz glass disposed in the extraction part and having an absorption band at least in a wavelength band of 240 nm to 260 nm.

14. The ultraviolet light irradiation device according to claim 13, wherein a wavelength at a local minimum of transmittance of the fused quartz glass is 240 nm or more and 250 nm or less.

15. The ultraviolet light irradiation device according to claim 14, wherein, assuming that a light intensity is 1 when light having a wavelength of 350 nm passes through the fused quartz glass, the light intensity is 0.95 or less at the local minimum value of transmittance through the fused quartz glass.

16. The ultraviolet light irradiation device according to claim 14, wherein the fused quartz glass has a hydroxyl (OH) group concentration of 50 wt·ppm or less.

17. The ultraviolet light irradiation device according to claim 14, wherein
the fused quartz glass satisfies at least one of:
a titanium (Ti) concentration in the fused quartz glass is 5 wt·ppm or less;
an iron (Fe) concentration in the fused quartz glass is 3 wt·ppm or less; and
a manganese (Mn) concentration in the fused quartz glass is 3 wt·ppm or less.

18. The ultraviolet light irradiation device according to claim 13, wherein, assuming that a light intensity is 1 when light having a wavelength of 350 nm passes through the fused quartz glass, the light intensity is 0.95 or less at the local minimum value of transmittance through the fused quartz glass.

19. The ultraviolet light irradiation device according to claim 13, wherein the fused quartz glass has a hydroxyl (OH) group concentration of 50 wt·ppm or less.

20. The ultraviolet light irradiation device according to claim 13, wherein
the fused quartz glass satisfies at least one of:
a titanium (Ti) concentration in the fused quartz glass is 5 wt·ppm or less;
an iron (Fe) concentration in the fused quartz glass is 3 wt·ppm or less; and
a manganese (Mn) concentration in the fused quartz glass is 3 wt·ppm or less.

\* \* \* \* \*